United States Patent [19]
Dittmar

[11] Patent Number: 5,887,490
[45] Date of Patent: Mar. 30, 1999

[54] ADJUSTABLE HANDLEBAR STEM USING A LOCKING PIN SYSTEM

[75] Inventor: Edbert E. L. Dittmar, Provo, Utah

[73] Assignee: Brigham Young University, Provo, Utah

[21] Appl. No.: 808,507

[22] Filed: Feb. 27, 1997

Related U.S. Application Data

[60] Provisional application No. 60/012,405 Feb. 28, 1996.

[51] Int. Cl.[6] .................................................. B62K 21/16
[52] U.S. Cl. ......................................... 74/551.3; 74/551.7
[58] Field of Search ............................... 74/551.3, 551.7, 74/551.6, 551.5, 551.4, 551.2, 555.1, 527

[56] References Cited

U.S. PATENT DOCUMENTS

| | | |
|---|---|---|
| 5,138,900 | 8/1992 | Hals . |
| 5,241,881 | 9/1993 | Chen . |
| 5,253,544 | 10/1993 | Allsop et al. . |
| 5,273,302 | 12/1993 | Ureel . |
| 5,456,135 | 10/1995 | Li .......................................... 74/551.7 |
| 5,560,262 | 10/1996 | Orzech ..................................... 74/527 |
| 5,564,315 | 10/1996 | Schuler et al. ............................ 74/527 |
| 5,678,457 | 10/1997 | Hals ....................................... 74/551.3 |

FOREIGN PATENT DOCUMENTS

| | | |
|---|---|---|
| 867249 | 10/1941 | France . |
| 2682348 | 4/1993 | France . |
| 1003619 | 2/1957 | Germany . |

*Primary Examiner*—Charles A Marmor
*Assistant Examiner*—Mary Ann Battista
*Attorney, Agent, or Firm*—Thorpe, North & Western, LLP

[57] ABSTRACT

An apparatus for adjusting the position of a handlebar on a bicycle or the like having a base member, an upper link, a lower link, and a intermediate member forming a parallelogram type link. A protrusion formed on the lower link extends into and slidably contacts a tracking slot formed in the upper link. A locking means for fixing the upper and lower links has a locking pin disposed in a bore formed in the upper link and extending through one of a plurality of holes formed in the protrusion of the lower link. The locking pin defines a locked position when extending into one of the plurality of holes and an unlocked position when released. The pin is biased in the locked position. A release lever is disposed on the upper link having a operating portion for grasping by a rider and a locking pin portion for engaging the locking pin.

21 Claims, 6 Drawing Sheets

ADJUSTABLE HANDLEBAR STEM USING A LOCKING PIN SYSTEM

This application claims the benefit of U.S. Provisional Application No. 60/012,405, filed Feb. 28, 1996.

BACKGROUND OF THE INVENTION

1. Field of the Invention

The present invention relates to an adjustable handlebar stem for bicycles and the like. More particularly, the present invention relates to parallelogram type linkage between the handle bars and the stem to permit adjustment of the position of the handle bars and a locking means for locking the upper and lower links in a fixed and stable position.

2. Prior Art

Bicycling for long distances can be uncomfortable because the rider must sit in the same position for extended periods of time. In addition, for riders with health problems, such as arthritis, bicycling for even short distances can become uncomfortable. Although bicycle components and configurations are typically adjustable, the adjustments require tools and the adjusted position is permanent for all practical purposes. For example, the stem and the seat may typically be adjusted vertically and the handle bars and seat rotate forward and back by loosening a bolt and clamp with a set of wrenches. These adjustments are usually made to accommodate the physical build of the intended user and are not readjusted. The difficulty in making the adjustments makes frequent changes to suit comfort unpractical. For example, a rider will not usually stop, dismount, obtain tools, loosen a component, adjust the component, tighten the component, put away the tools, and continue riding every time the rider feels uncomfortable.

In addition, many bicycle components and configurations are intended for specific purposes. For example, racing and mountain bicycles often have handle bars that are positioned low and forward with respect to the bicycle and away from the rider. Touring bicycles often have handle bars positioned high and back with respect to the bicycle and towards the rider. These components and configurations take advantage of efficiencies inherent in the rider's posture. A rider positioned low and forward is more suited to racing or climbing while a rider positioned high and back is more suited to touring. While many riders are dedicated enough to a particular type of riding, such as racing, to own a bicycle specifically designed for that purpose, others own a single bicycle that is used for all purposes, such as mountain biking, touring, and racing. Because a rider lacks the dedication to any particular type of riding, or perhaps lacks the funds to own several bicycles, the rider must settle on one style of bicycle and use it, with the inherent inefficiencies, for all types of riding.

Furthermore, all types of riders encounter various riding conditions that may alter the preferred posture of the rider. For example, while climbing or riding at high speed, the rider may wish to be positioned low and forward. But as traffic is encountered, the rider may prefer to be positioned high and back.

U.S. Pat. No. 5,138,900 issued on Aug. 18, 1992 to Hals discloses a quadrilateral type linkage between the handlebars and the stem to allow the handlebars to be adjusted between a low and forward position to a higher and back position. The position of the handlebars is fixed by a wheel hub quick-clamp mechanism disposed on an upper link engaging a groove formed in a lower link. Thus, the upper and lower links are essentially clamped together and held by friction. One problem with this method for positioning the handlebars is that the friction type connection between the upper and lower links may be overcome by a large force causing an abrupt change in the handlebar position. An abrupt change in the handlebar position may cause the rider to lose balance or control. In other words, if the rider exerts a large force on the handlebars, as when the rider hits a bump or dip, the friction connection between the links may loosen and cause the position of the handlebars to adjust abruptly. This abrupt change may cause the rider to lose control, injuring himself and damaging the bicycle.

Alternatively, Hals discloses a cable operated conical plunger disposed in the upper link and engaging a conical recess formed in the lower link to fix the position of the handlebars. One problem with this method of fixing the handlebar position is that the tapper or conical shape of the plunger and recess may enable the plunger to slip from the recess when a large force is exerted on the handlebars. Furthermore, the cable system adds complexity and provides an additional area for possible failure.

U.S. Pat. No. 5,273,302 issued on Dec. 28, 1993 to Ureel discloses a parallelogram type linkage between the handlebars and the stem to allow the handlebars to change positions. The position of the handlebars is fixed by a pin disposed in a handlebar member engaging radially extending slots formed in the end of one of the links, like a toothed gear. One problem with this method of positioning the handlebar is that the link attached to the toothed gear acts as the long arm of a lever. Force applied to the mechanism is multiplied by the length of the link, thus tending to cause an excessive force and risk of failure at the teeth of the gear.

Another problem with both the Hals and Ureel devices is their structure. The linkage structures disclosed by Hals and Ureel are loose and unstable. For proper control and feel, bicycling requires that the structure of the bicycle be firm and solid. In addition, for some types of bicycling, such as mountain biking, the structure must have great strength. Furthermore, the bulk of the structures does not lend themselves to the streamline, efficient, light-weight style of bicycling.

Therefore, it would be advantageous to develop an apparatus for adjusting the position of the handlebars to adapt the bicycle to the riding conditions encountered and to change the riders posture for comfort. It would also be advantageous to develop and apparatus for easily adjusting the position of the handlebars while riding. It would also be advantageous to develop and apparatus for adjusting the position of the handlebars of a bicycle while maintaining control and the firm and solid feel of the bicycle and maintaining the efficient, lightweight style of bicycling.

OBJECTS AND SUMMARY OF THE INVENTION

It is an object of the present invention to provide an adjustable handlebar stem that can adjust the position of the handlebars.

It is another object of the present invention to provide an adjustable handlebar stem that may be positively locked into position.

It is another object of the present invention to provide an adjustable handlebar stem that may be indexed through several positions.

It is yet another object of the present invention to provide an adjustable handlebar stem capable of being adjusted by the rider while riding.

It is a further object of the present invention to provide an adjustable handlebar stem that is capable of being adjusted without the use of tools.

It is a further object of the present invention to provide an adjustable handlebar stem that is firm and solid and thus capable of maintaining the control and feel of the bicycle or other vehicle.

It is a further object of the present invention to provide an adjustable handlebar stem that has a structure capable of withstanding strong forces, such as encountered while mountain biking.

Still another object of the present invention is to provide an adjustable handlebar stem that has a structure compatible with the efficient, light-weight style of bicycling.

These and other objects and advantages of the present invention are realized in an adjustable handlebar stem having a base member, intermediate member, and upper and lower links pivotally attached to form a parallelogram type link. The base member attaches to a vehicle, or in the case of a bicycle, to a stem for attachment to a fork tube. The intermediate member has coupling means to couple the intermediate member to a handlebar or the handlebar may be attached directly to the intermediate member. The intermediate member may rotate about the base member so that the handlebar may be adjusted from a low and forward position to a high and back position. The intermediate member remains in substantially the same orientation as it rotates about the base member.

A protrusion is formed in the lower link and extends into a tracking slot formed in the upper link. The protrusion moves within the slot and preferable has side walls that slidingly contact side walls in the slot to provide rigidity to the parallelogram link. Preferably, a portion of the lower link, in addition to the protrusion, extends into the tracking slot when the parallel link is in the low and forward position or the high and back position. In addition, the protrusion preferably extends to the upper link axis, the axis extending along the length of the upper link between pivot points. The protrusion and lower link extending into the slot and slidably contacting the side walls of the slot provide rigidity to the parallelogram link.

The adjustable handlebar stem also has a locking means for locking or fixing the lower link and upper link in a fixed and stable position with respect to the base member and intermediate member. Preferably, the locking means is a locking pin disposed in a bore in the upper link extending into one of a plurality of indexing holes formed in the protrusion of the lower link. A locked position is defined by the locking pin extending into one of the indexing holes and an unlocked position is defined when the pin is retracted. The locking pin is biased in the locked position. The locking pin and indexing holes have a horizontal axis. Preferably, the locking pin extends through one of the indexing holes and within both side portions of the upper link located on both sides of the protrusion. The locking pin is also preferably substantially untapered. A release lever is disposed on the upper link and is coupled to the locking pin. An operating portion of the lever is configured to be easily grasped by the rider for releasing the pin and adjusting the parallelogram link while riding. The horizontal configuration of the locking pin, the untapered configuration, and disposition of the locking pin within the side portions of the upper link provide a positive lock that resists accidental release. In addition, any wear on the locking pin by the lower link only increase the locking ability of the locking pin.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
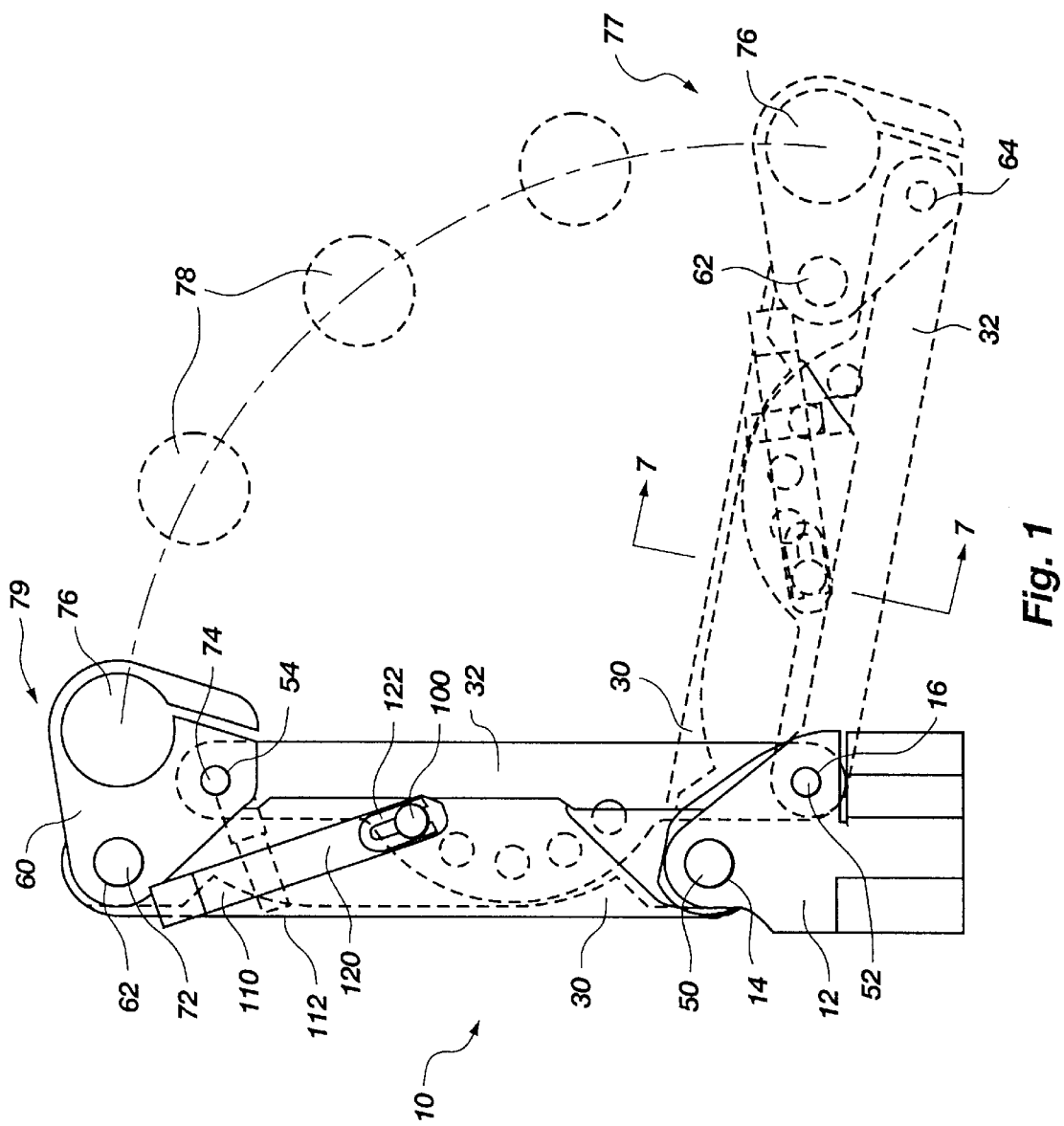
FIG. 1 is an elevational side view of an adjustable handlebar stem of the present invention shown moving through a series of positions.

As illustrated in FIG. 1, an adjustable handlebar stem 10 is shown in accordance with a preferred embodiment of the present invention. The adjustable handlebar stem 10 has a base member 12. The base member 12 attaches to a vehicle (not shown). In the case of a bicycle, the base member 12 may be attached to a stem or formed integrally with the stem which in turn is received inside a fork tube or a headset. A first bore 14 and a second bore 16 are formed in the base member 12 and define a first pivot point and a second pivot point respectively.

Figure 2:
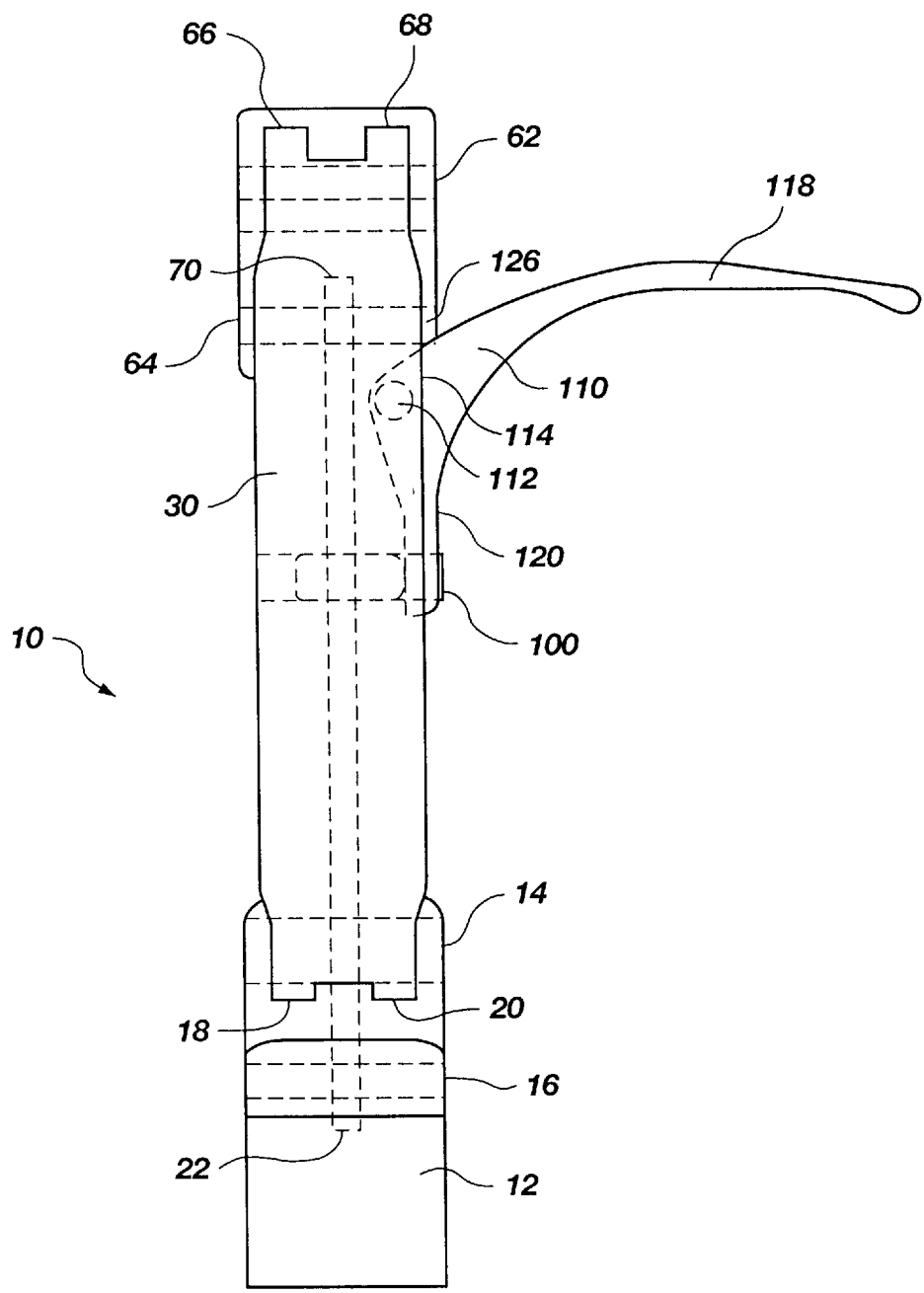
FIG. 2 is an elevational front view of an adjustable handlebar stem of the present invention.

Referring to FIG. 2, a first groove 18 and a second groove 20 are formed in the base member 12. The grooves 18 and 20 are perpendicular to the first bore or first pivot point 14. A third groove 22 is also formed in the base member 12. The third groove 22 is perpendicular to the second bore or second pivot point 16.

As illustrated in FIG. 1, the adjustable handlebar stem 10 has an upper link 30 and a lower link 32. The upper link 30 and lower link 32 are pivotally attached to the base member 12.

Figure 3:
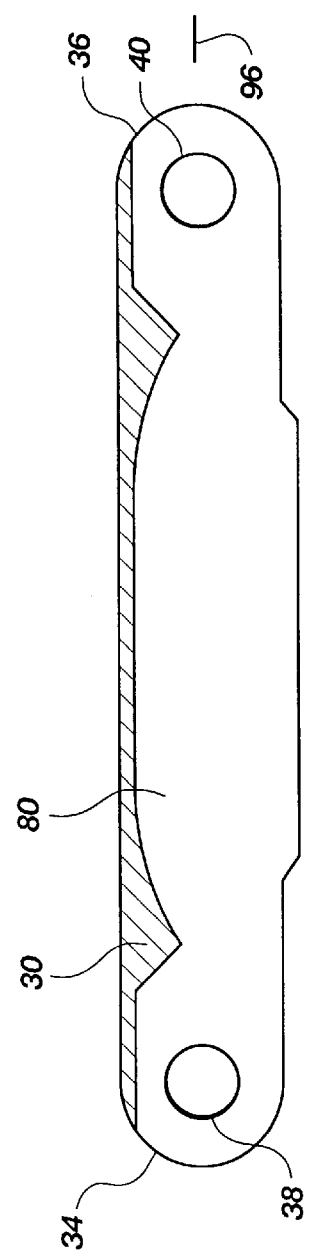
FIG. 3 is an elevational cross-section side view of the upper link of an adjustable handlebar stem of the present invention.
Figure 5:
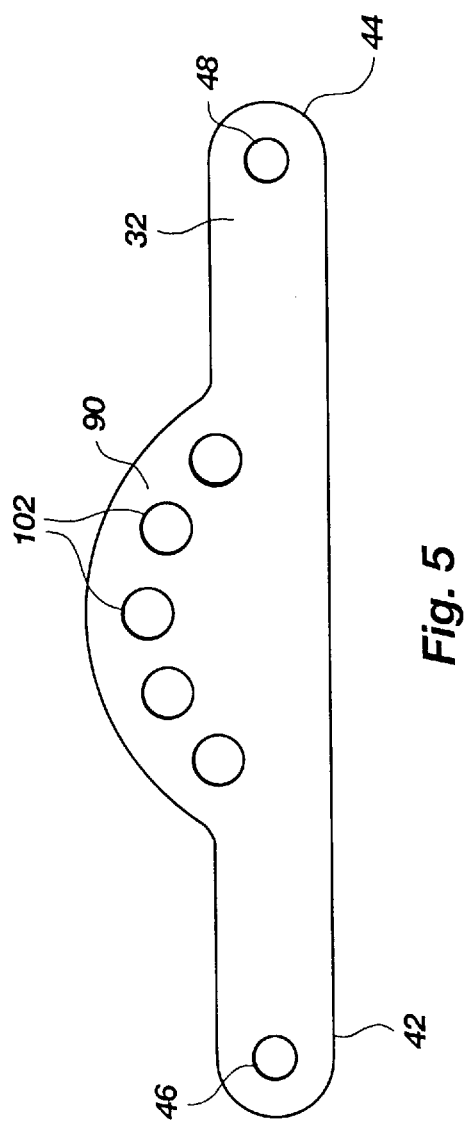
FIG. 5 is an elevational side view of the lower link of an adjustable handlebar stem of the present invention.

Referring to FIG. 3, the upper link 30 has a first end 34 and a second end 36. A first bore 38 is formed in the first end 34 and a second bore 40 is formed in the second end 36. Referring to FIG. 5, the lower link 32 has a first end 42 and a second end 44. A first bore 46 is formed in the first end 42 and a second bore 48 is formed in the second end 44.

As illustrated in FIG. 1, the upper link 30 is pivotally attached to the base member 12 by a first pivot pin 50 disposed in the first bore 14 in the base member 12 and the first bore 38 (not shown in FIG. 1) in the upper link 30. Likewise, the lower link 32 is pivotally attached to the base member 12 by a second pivot pin 52 disposed in the second bore 16 in the base member 12 and the first bore 46 (not shown in FIG. 1) in the lower link 32. Portions of the upper link 30 fit within the first and second grooves 18 and 20 in the base member 12 as shown in FIG. 2. The lowers ink 32 fits within the third groove 22 in the base member 12 as shown in FIG. 2.

The adjustable handlebar stem 10 has an intermediate member 60. A first bore 62 and a second bore 64 are formed in the intermediate member 60 and define a third pivot point and a fourth pivot point respectively.

Referring to FIG. 2, a first groove 66 and a second groove 68 are formed in the intermediate member 60. The grooves 66 and 68 are perpendicular to the first bore or third pivot point 62. A third groove 70 is also formed in the intermediate member 60. The third groove 70 is perpendicular to the second bore or fourth pivot point 64.

As illustrated in FIG. 1, the upper link 30 and lower link 32 are pivotally attached to the intermediate member 60. The upper link 30 is pivotally attached to the intermediate member 60 by a third pivot pin 72 disposed in the first bore 62 in the intermediate member 60 and the second bore 40 (not shown in FIG. 1) in the upper link 30. Likewise, the lower link 32 is pivotally attached to the intermediate member 60 by a fourth pivot pin 74 disposed in the second bore 64 in the intermediate member 60 and the second bore 48 (not shown in FIG. 1) in the lower link 32. Portions of the upper link 30 fit within the first and second grooves 66 and 68 in the intermediate member 60. The lower link 32 fits within the third groove 70 in the intermediate member 60.

In the preferred embodiment, the pivot pins 50, 52, 72 and 74 and the bores 14 and 16 in the base member 12 and the bores 62 and 64 in the intermediate member 60 are sized such that the pins 50, 52, 72 and 74 are press fit within the bores 14, 16, 62 and 64. The press fit adds to the stability of the structure. Alternatively, other means of pivotally attaching the links 30 and 32 to the base member 12 could be used, such as a bolt and nut combination.

The intermediate member 60 has a coupling means for coupling the intermediate member 60 to a handlebar 76. The intermediate member 60 may connect to a handlebar clamp (not shown) or be formed integrally with a clamp in which the handlebar 76 is disposed, as shown in FIG. 1.

As illustrated in FIG. 1, the base member 12, intermediate member 60, upper link 30, and lower link 32 substantially form a parallelogram or parallelogram type link. Because they are all pivotally attached, the intermediate member 60 may rotate about the base member 12. In the preferred embodiment of the present invention, the intermediate member 60 may rotate through approximately 120 degrees. Because of the parallelogram structure, the intermediate member 60 remains in substantially the same orientation, or at substantially the same angle, as it rotates about the base member 12. The intermediate member 60 may be adjusted from a low and forward position 77, through intermediate positions 78, to a high and back position 79. Alternatively, the various members and links 12, 60, 30, and 32 may form any type of four-bar link, the parallelogram link being a type of four-bar link. In a four-bar link, the opposing members or links may not necessarily be the same length and the distance between the pivot points may not be the same. By varying the distance between the pivots, the orientation of the handlebar may be changed as it rotates about the base member.

Figure 4:
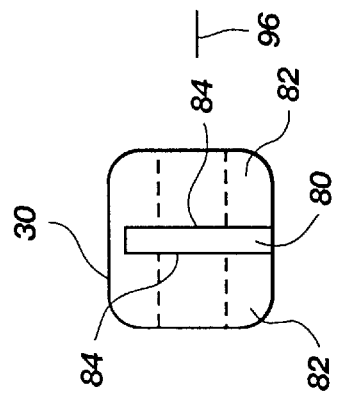
FIG. 4 is an elevational end view of the upper link of an adjustable handlebar stem of the present invention.

As illustrated in FIGS. 3 and 4, a tracking slot 80 is formed in the upper link 30. Referring to FIG. 4, the upper link 30 has a U-shaped cross section with side portions 82 of the upper link 30 on either side of the tracking slot 80. The tracking slot 80 has generally parallel, opposing side walls 84.

Figure 6:
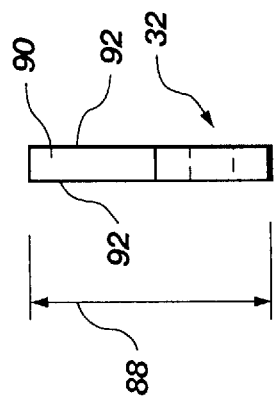
FIG. 6 is an elevational end view of the lower link of an adjustable handlebar stem of the present invention.

As illustrated in FIGS. 5 and 6, a protrusion 90 is formed on the lower link 32. Referring to FIG. 6, the protrusion 90 has generally parallel, opposing side walls 92. Preferably, the lower link 32 shares the side walls 92 of the protrusion 90.

Figure 7:
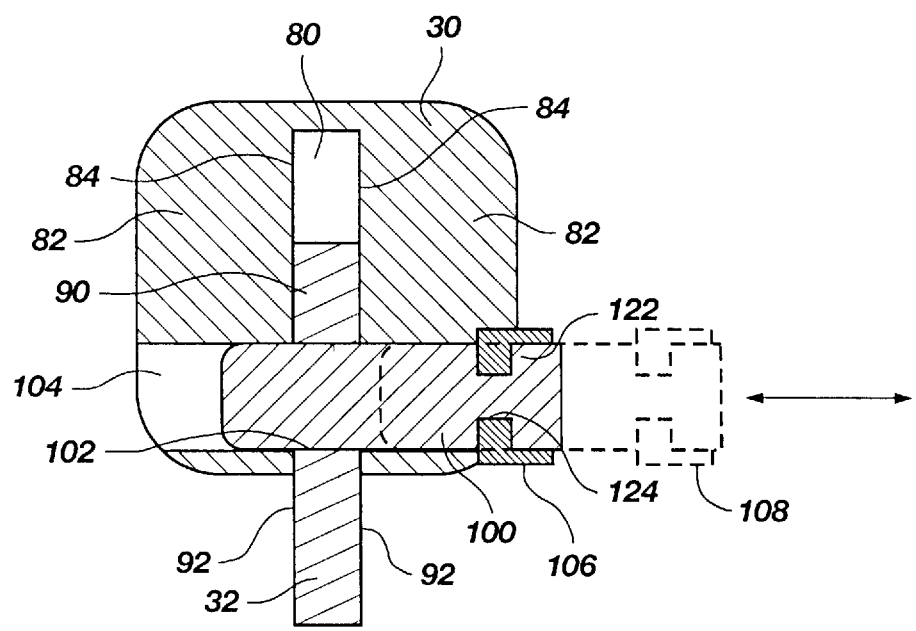
FIG. 7 is a cross-section view of a shot pin engaging the upper and lower links of the present invention taken along line 7—7 of FIG. 1.
Figure 8:
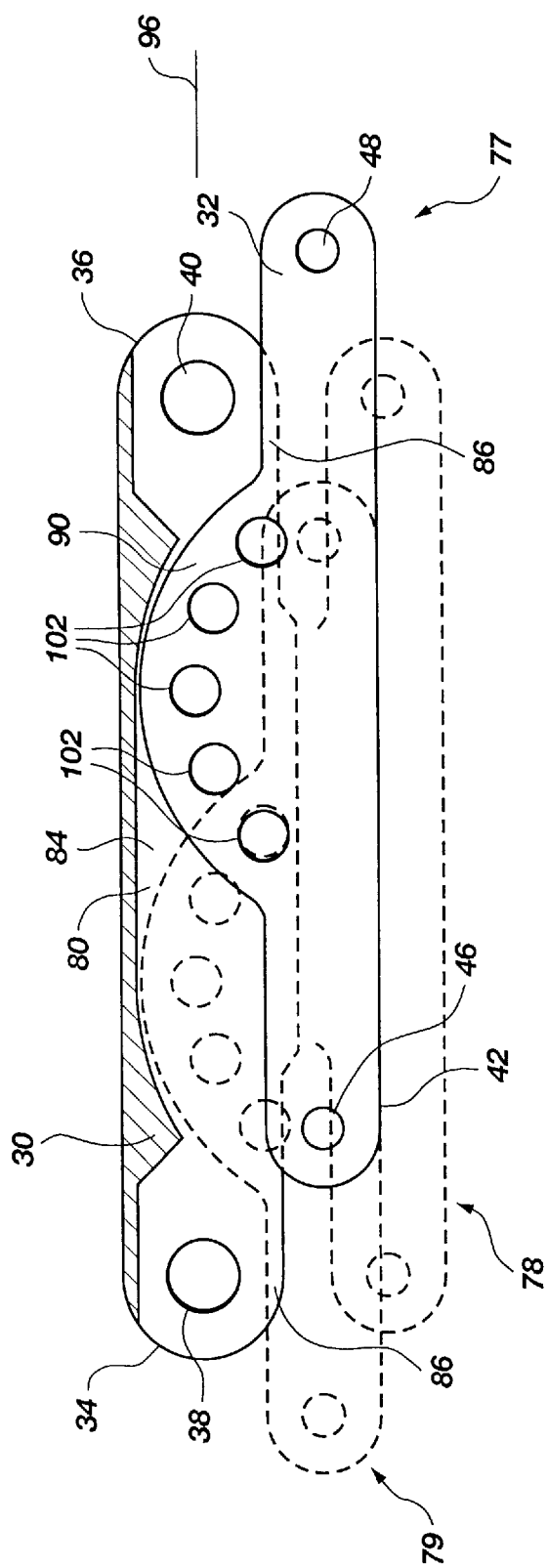
FIG. 8 is an elevational cross-section view of the upper and lower links of an adjustable handlebar stem of the present invention shown with the lower link moving through a series of positions.

As illustrated in FIGS. 7 and 8, the protrusion 90 extends into the tracking slot 80. The protrusion 90 is sized to be able to move within the slot 80. Preferably, the side walls 92 of the protrusion 90 are in sliding contact with the side walls 84 of the tracking slot 80. The sliding contact allows the protrusion 90 to move within the slot 80 while providing rigidity to the parallelogram linkage structure and preventing the structure from twisting.

As the adjustable stem 10 is positioned between the low and forward position 77 and the high and back position 79, the protrusion 90 moves within the slot 80. Preferably, a portion 86 of the lower link 32 extends into the slot 80 when the stem 10 is in either the low and forward position 77 or the high and back position 79. The lower link 32 has a height 88, as shown in FIG. 6. When the stem 10 is in the low and forward position 77 or the high and back position 79, approximately two-thirds of the lower link height 88 extends into the tracking slot 80, as seen in FIG. 8.

In addition, when the stem 10 is in the low and forward position 77 or the high and back position 79, the protrusion 90 extends to or past the upper link axis 96, as shown in FIG. 8. The upper link axis 96 extends along the length of the upper link 30 between the first bore 38 and second bore 40 or the first and third pivot points 50 and 72 as shown in FIG. 3. Having a portion 86 of the lower link 32 extending into the slot 80 and the protrusion 90 extending to the upper link axis 96 adds rigidity to the structure and prevents it from twisting. Prior art structures failed to adequately address the need for rigid and strong members.

As illustrated in FIG. 7, the adjustable stem 10 also has a locking means to fix or lock the upper link 30 and the lower link 32 in a fixed and stable position with respect to the base member 12 and intermediate member 60, and thus the position of the stem 10. In the preferred embodiment, the upper link 30 and lower link 32 are locked by a locking pin 100 disposed in the upper link 30 and retractably engaging or extending into one of a plurality of indexing holes 102 formed in the protrusion 90 on the lower link 32.

Referring to FIGS. 5 and 8, a plurality of indexing holes 102 are formed in the protrusion 90 on the lower link 32. Preferably, the protrusion 90 forms an arc with the holes 102 formed within the protrusion 90 along the arc. Referring to FIG. 7, a locking pin 100 is disposed in a locking pin bore 104 formed in the upper link 30. The locking pin 100 is sized to move within the bore 104. A locked position 106 is defined by the pin 100 extending into one of the plurality of indexing holes 102. An unlocked position 108 is defined by the pin 100 retracted from the indexing hole 102. The pin 100 is biased in the locked position. Preferably, the pin 100 extends within both of the side portions 82 of the upper link 30 on both sides of the protrusion 90 when in the locked position 106. In addition, the pin 100 may preferably be straight or slightly tapered along its length. Generally, the preferred taper will be less than 10 degrees with an applied spring pressure at the lever end of approximately 5 lbs. Thus, the pin 100 positively locks.

The axes of the pin 100, bore 104, and indexing holes 102 are horizontal. Thus, forces applied to the stem 10 are transferred through the links 30 and 32 and subject the pin 100 to shear stress. Any movement of the links 30 and 32 while in the locked position will cause the pin 100 to wear in the center where it contacts the lower link 32. Thus, any wear on the pin 100 and links 30 and 32 increases the locking ability of the pin 100.

Prior art locking mechanisms utilized frictional clamping, tapered plungers, or a pin disposed in a toothed gear. Frictional engagements are inherently unsuitable because they may slip and become loose over time. A severely tapered plunger is prone to disengage due to the tapper. The link attached to the toothed gear acts as the long arm of a lever. Force applied to the mechanism is multiplied by the length of the link, thus tending to cause an excessive force and risk of failure at the teeth of the gear.

As illustrated in FIG. 2, a release lever 110 is disposed on the upper link 30 and is coupled to the locking pin 100. The lever 110 is secured to the upper link 30 by a lever pin 112 disposed in a lever bore 114 (not shown in FIG. 2) formed in the lever 110 and a lever bore 116 formed in the upper link 30. Alternatively, a screw or bolt or the like may be used in place of the pin 112. The release lever 110 has an operating portion 118 for the rider to grasp and a pin portion 120 for coupling to the pin 100. The operating portion 118 is configured much like other handlebar levers such as a brake lever. Thus, the rider may easily adjust the stem 10 while riding. Referring to FIGS. 1 and 7, a fork, prong, or horseshoe 122 is formed on the pin portion 120. The horseshoe engages an annular groove 124 formed in the pin 100 as shown in FIG. 7. A spring 126 is positioned between the lever 110 and the upper link 30 to bias the locking pin 100 in the locked position 106, as shown in FIG. 2. As the rider operates the operating portion 118 of the lever 110, the lever 110 pivots about the lever pin 112 and the pin portion 120 of the lever 110 retracts the locking pin 100, thus releasing the links 30 and 32 so that the stem 10 may be adjusted. It is of course understood that any number of methods or devices may be used for coupling the lever 110 and the pin 100, for example a finger formed in the lever may extend into a slot formed in the pin. In addition, other methods or devices may be used for retracting the locking pin.

Although the present invention has been described with particular reference and by example to a handlebar of a bicycle, it is of course understood that the present invention may be applied to a handlebar in any application.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. An adjustable handlebar stem apparatus for adjusting the position of handlebars, said apparatus comprising:

a base member, the base member having a first pivot point and a second pivot point;

an upper link pivotally attached to the base member, the upper link having a first end and a second end, the first end being attached to the first pivot point of the base member, the upper link having a tracking slot formed therein with side portions on either side of the tracking slot;

a lower link pivotally attached to the base member, the lower link having first end and a second end, the first end being attached to the second pivot point of the base member, the lower link having a protrusion formed thereon and extending into the tracking slot of the upper link;

an intermediate member pivotally attached to the upper link and the lower link, the intermediate member having a first pivot point and a second pivot point, the first pivot point of the intermediate member being attached to the second end of the upper link and the second pivot point of the intermediate member being attached to the second end of the lower link; and a locking means for locking the upper link and the lower link in a fixed, stable position with respect to the base member and the intermediate member, the locking means comprising a plurality of indexing holes formed in the protrusion of the lower link, and a locking pin movably disposed in a bore formed in the upper link and including means for retractably engaging one of the plurality of indexing holes, the locking means providing i) a locked position when the locking pin engages one of the plurality of indexing holes and ii) an unlocked position when retracted from the hole, the locking pin extending through one of the indexing holes on the protrusion of the lower link and into both side portions of the upper link when in the locked position.

2. The apparatus of claim 1, wherein the intermediate member has coupling means for coupling the intermediate member to a handlebar.

3. The apparatus of claim 1, wherein the locking pin is biased in the locked position.

4. The apparatus of claim 1, wherein the locking means further comprises:

a release lever disposed on the upper link and being coupled to the locking pin, the lever being spring biased to maintain the locking pin in the locked position.

5. The apparatus of claim 1, wherein the protrusion forms an arc and the plurality of indexing holes are formed within the protrusion along the arc.

6. The apparatus of claim 1, wherein a handlebar is coupled to the intermediate member.

7. The apparatus of claim 1, wherein the tracking slot has side walls and the protrusion has side walls, the side walls of the tracking slot being in sliding contact with the side walls of the protrusion to provide rigidity to the apparatus.

8. The apparatus of claim 1, wherein the protrusion extends to an upper link axis.

9. The apparatus of claim 1, wherein a portion of the lower link extends into the tracking slot.

10. The apparatus of claim 9, wherein at least one-third of the lower link extends into the tracking slot.

11. The apparatus of claim 9, wherein at least two-thirds of the lower link extend into the tracking slot.

12. The apparatus of claim 1, wherein the base member, the lower link, the upper link, and the intermediate member substantially form a parallelogram.

13. The apparatus of claim 1, wherein the intermediate member may rotate about the base member from a low and forward position to a high and back position.

14. The apparatus of claim 13, wherein the intermediate member remains in the same orientation as it rotates about the base member.

15. The apparatus of claim 1, wherein the upper link has a U-shaped cross section with the tracking slot formed between two side portions.

16. An adjustable handlebar stem apparatus for adjusting the position of handlebars, said apparatus comprising:

a four-bar link having a base member, an upper link and a lower link pivotally attached to the base member at separate pivot points, and an intermediate member pivotally attached to the upper link and the lower link at separate pivot points;

a tracking slot formed in the upper link;

a protrusion formed in the lower link and extending into the tracking slot, the protrusion extending to an upper link axis which connects the pivot points of the upper link; and a locking means for locking the upper link and the lower link.

17. The apparatus of claim 16, wherein the upper link has side portions on either side of the tracking slot, and wherein the locking means comprises a plurality of indexing holes formed in the protrusion of the lower link, and a locking pin movably disposed in a bore formed in the upper link and including means for retractably engaging one of the plurality of indexing holes, the locking means providing i) a locked position when the locking pin engages one of the plurality of indexing holes and ii) an unlocked position when retracted from the hole, the locking pin extending through one of the indexing holes on the protrusion of the lower link and into both side portions of the upper link when in the locked position.

18. The apparatus of claim 17, wherein the plurality of indexing holes and the locking pin are horizontal and substantially untapered.

19. An adjustable handlebar stem apparatus for adjusting the position of handlebars, said apparatus comprising:

a base member, the base member having a first pivot point and a second pivot point;

an upper link pivotally attached to the base member, the upper link having a first end and a second end, the first end being attached to the first pivot point of the base member, the upper link having a tracking slot formed therein;

a lower link pivotally attached to the base member, the lower link having a first end and a second end, the first end being attached to the second pivot point of the base member, the lower link having a protrusion formed thereon and extending into the tracking slot of the upper link;

an intermediate member pivotally attached to the upper link and the lower link, the intermediate member having a first pivot point and a second pivot point, the first pivot point of the intermediate member being attached to the second end of the upper link and the second pivot point of the intermediate member being attached to the second end of the lower link; and a locking means for locking the upper link and the lower link in a fixed, stable position with respect to the base member and the intermediate member;

wherein the protrusion extends to an upper link axis which connects the first pivot point of the base member and the first pivot point of the intermediate member.

20. The apparatus of claim 19, wherein the locking means comprises a plurality of indexing holes formed in the protrusion of the lower link, and a locking pin movably disposed in a bore formed in the upper link and including means for retractably engaging one of the plurality of indexing holes, the locking means providing i) a locked position when the locking pin engages one of the plurality of indexing holes and ii) an unlocked position when retracted from the hole, the locking pin extending through one of the indexing holes on the protrusion of the lower link and into two side portions of the upper link when in the locked position.

21. The apparatus of claim 20, wherein the plurality of indexing holes and the locking pin are horizontal and substantially untapered.

* * * * *